United States Patent [19] [11] 4,242,818
Carver [45] * Jan. 6, 1981

[54] COLLAPSIBLE PHOTOGRAPHIC SLIDE VIEWER

[75] Inventor: Robert G. Carver, Ashland, Ohio

[73] Assignee: Creative Cartons of Ashland, Inc., Ashland, Ohio

[*] Notice: The portion of the term of this patent subsequent to Nov. 27, 1996, has been disclaimed.

[21] Appl. No.: 964,474

[22] Filed: Nov. 29, 1978

[51] Int. Cl.³ ............................................. G09F 13/00
[52] U.S. Cl. ........................................ 40/364; 40/365
[58] Field of Search ................. 350/140; 40/364, 365, 40/366

[56] References Cited

U.S. PATENT DOCUMENTS

| 2,543,240 | 2/1951 | Hutchinson | 40/365 |
| 2,768,554 | 10/1956 | Leslie | 350/140 |
| 2,789,460 | 4/1957 | Kaufman | 350/140 |

Primary Examiner—John F. Pitrelli
Assistant Examiner—G. Lee Skillington
Attorney, Agent, or Firm—Squire, Sanders & Dempsey

[57] ABSTRACT

A collapsible optical viewer is comprised of a front wall having a light-admitting opening therein; a rear wall assembly having a coincident viewing aperture therein; top and bottom walls contiguous with the front and rear walls; and, side walls, one of which includes a continuous extension for forming a channel proximate the front wall whereby a photographic film strip may be received therein. A blank suitable for assembling the viewer is also described.

14 Claims, 7 Drawing Figures

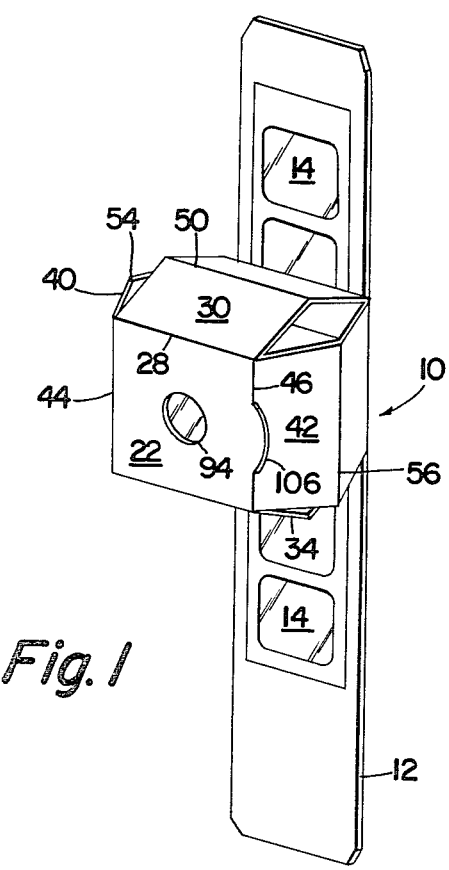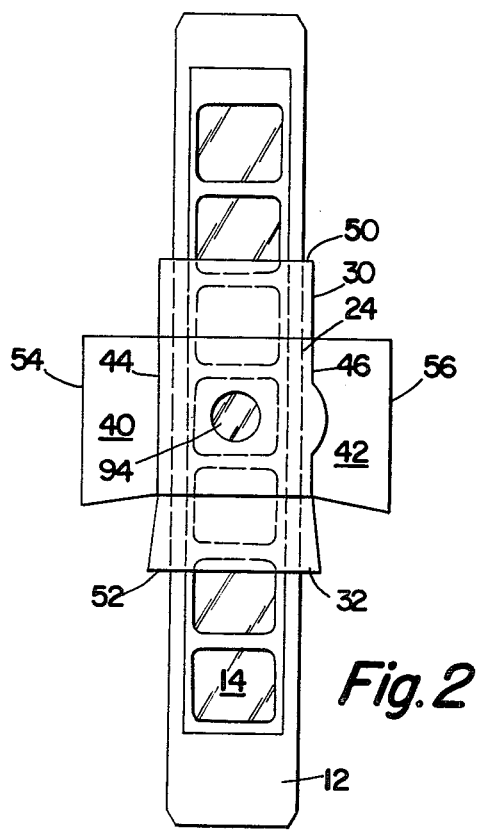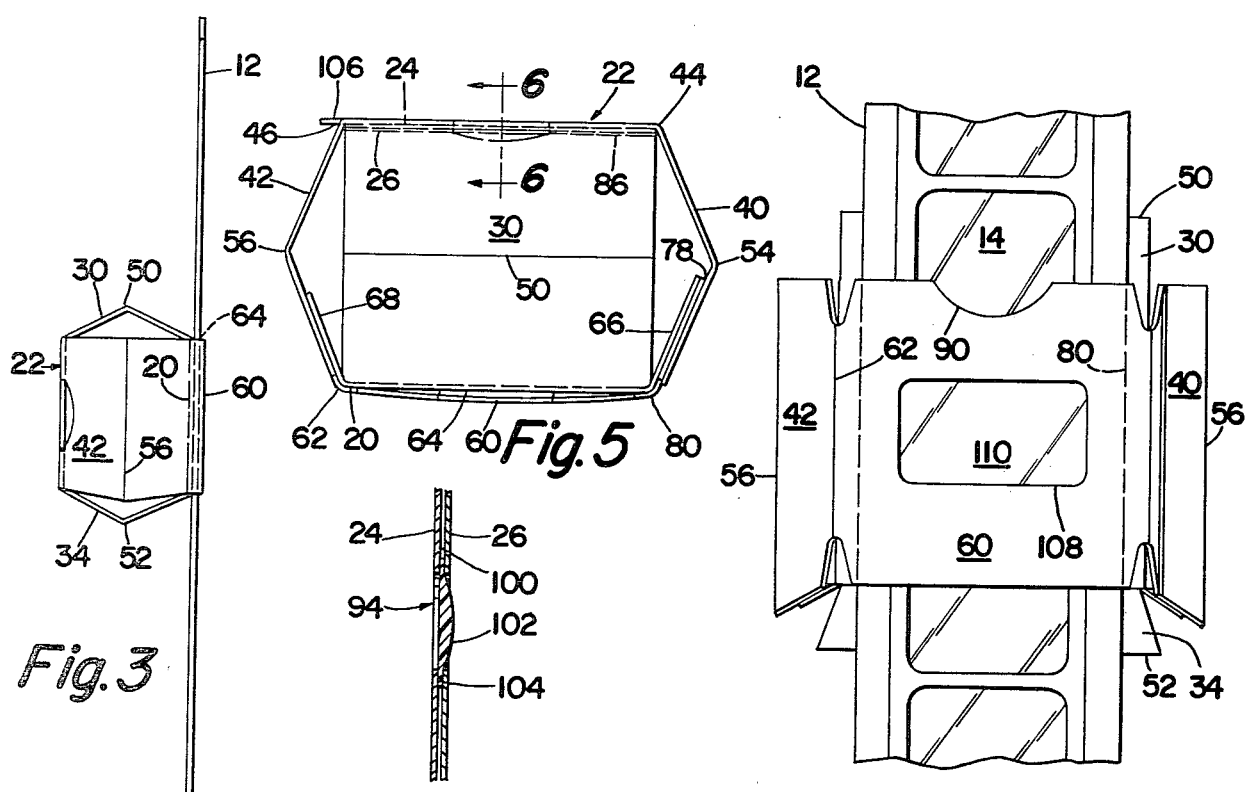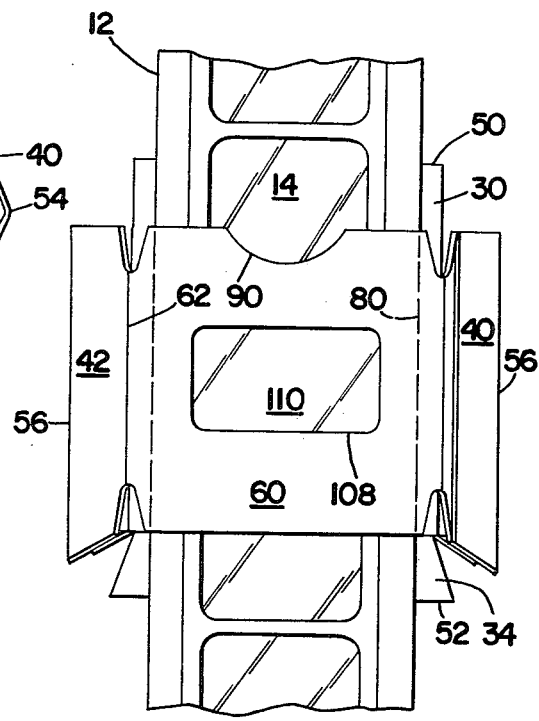

COLLAPSIBLE PHOTOGRAPHIC SLIDE VIEWER

CROSS-REFERENCE TO RELATED APPLICATIONS

The present application relates to the same field as my co-pending application Ser. No. 904,857, filed on May 11, 1978 now U.S. Pat. No. 4,175,828, entitled "COLLAPSIBLE STEREOSCROPIC VIEWER AND FILM STRIP THEREFOR", which is commonly assigned; which application is incorporated herein by reference.

The present invention relates to photographic slide viewers. More particularly, the present invention relates to disposable, collapsible monocular photographic slide viewers.

Various types of photographic slide viewers, including sterographic slide viewers, which may be folded, are known. Conventionally, such slide viewers include a front wall having a light-admitting opening for illuminating a photographic slide, and a rear wall having a viewing aperture which routinely houses a magnification lens. Collapsible viewers are also known; certain of said viewers are adapted for disposable use by virtue of their construction from cardboard or like materials. Routinely, some means for insuring relative movement between an inserted film strip and the viewer itself are provided, such as a film strip receiving channel adjacent the front wall of the viewer. Light diffusing elements are conventionally incorporated into light-admitting openings. Exemplary of such optical viewers are U.S. Pat. Nos. 2,789,460, No. 2,859,548, No. 2,933,015, No. 2,986,830, No. 3,019,691, No. 3,386,194, No. 3,553,855 and No. 3,562,939.

Viewers disclosed in such patents either require elaborate assembly to yield a finished viewer from the blank stage or have insufficient structural integrity to withstand extended use. Other prior art designs require the attahcments of an independent film-receiving channel to a completed optical viewer.

The need exists to provide a collapsible, preferably disposable, optical viewer which is of simple physical design, is easily assembled from a blank, and which (although disposable) possesses sufficient structural integrity to allow for extended use.

It is, therefore, a primary object of the present invention, to provide an optical viewer which is of relatively simple construction.

Another object of the present invention is to provide a collapsible, disposable optical viewer which is structurally sound and adapted for extended use.

Another object of the present invention is to provide a blank from which an optical viewer of the aforementioned character may be assembled.

It has not been determined that the foregoing objects may be realized, in accordance with the present invention, by providing a collapsible optical slide viewer comprising a front wall having a light-admitting opening therein; a rear wall assembly having a viewing aperture wherein the optical axis is coincident with the light-admitting opening in the front wall; a magnification lens in the aperture; top and bottom walls contiguous with the front and rear walls; and, an integral film strip receiving channel outwardly proximate the front wall, which channel is formed from a continuous extension of one of the side walls. The rear wall assembly is, preferably, comprised of a pair of panel members, one of which is folded 180 degrees into engagement with the interior surface of the other in such a manner that a transverse pocket is formed.

Assembly of the optical viewer of the present invention from the blank is materially simplified by virtue of the design of the latter, whereby gluing or sealing operations are minimized while structural integrity is maximized. This is attributable, in part, to the manner in which the film receiving channel is formed from a continuous extension of one of the side walls of the viewer.

Further objects and advantages of the present invention will become apparent to the skilled artisan upon examination of the detailed description of the invention, taken in conjunction with the figures of drawings, wherein:

FIG. 1 is an isometric view of the optical viewer of the present invention and associated film strip holder;

FIG. 2 is a rear elevation view of an optical viewer of the present invention;

FIG. 3 is a side elevation view of an optical viewer of the present invention;

FIG. 4 is a fragmentary front elevation view of the optical viewer of the present invention and the associated film strip holder;

FIG. 5 is a top elevation view of an optical viewer of the present invention.

FIG. 6 is an exploded, fragmentary, sectional view of the viewing aperture and associated lens, taken substantially along the line 6—6 of FIG. 5; and, FIG. 7 is a top plan view of a blank from which the optical viewer of the present invention is assembled.

Figure 7:
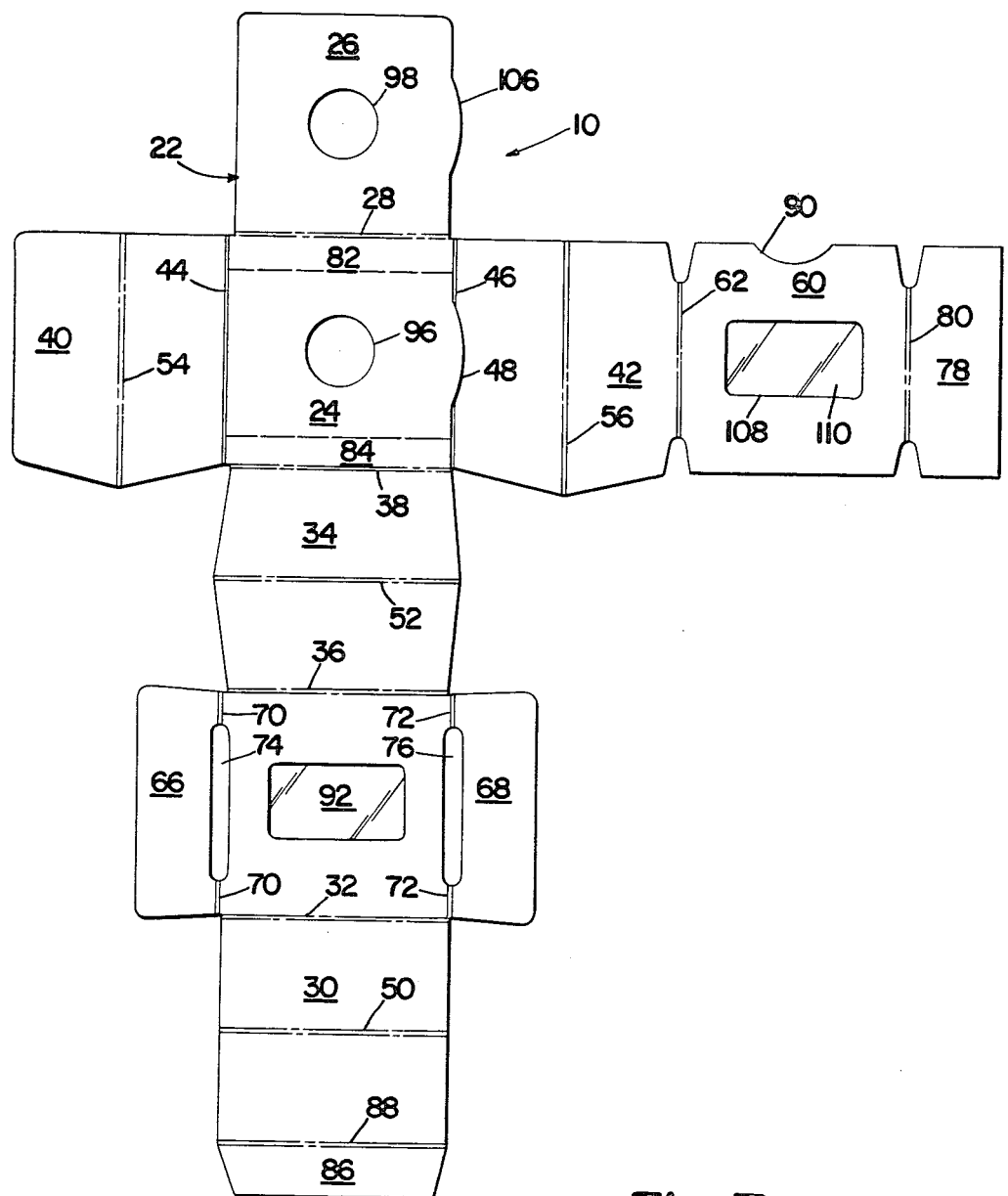

Referring now to the figures of drawing, in all of which like parts are identified with like reference numerals, FIG. 1 shows a collapsible optical viewer of the present invention, designated generally as 10, and an associated film strip 12 having a number of photographic slides 14 therein for viewing. For ease of description of the various elements comprising the viewer body 10, as well as a better appreciation of the cooperative nature of the same, reference is made to FIG. 7 which shows a blank 10' from which the viewer body 10 is assembled.

The viewer 10 is comprised of a front wall 20 and a rear wall assembly, designated generally as 22. The rear wall assembly includes a rear wall member 24 and a rear wall reinforcing element 26 contiguous about a transverse score line 28. For ease of description, all lines parallel to line 28 will be referred to herein as "transverse", while all lines perpendicular thereto will be described as "longitudinal", regardless of actual orientation.

A top wall 30 is contiguous with front wall 20 along a transverse fold line 32; while a bottom wall 34 is contiguous with the front wall 20 and rear wall assembly 24 along transverse fold lines 36 and 38, respectively. A pair of side walls 40 and 42 are contiguous with the rear wall assembly 22 along longitudinal fold lines 44 and 46, respectively. For purposes explained more fully below, the longiudinal fold line 46 is a discontinuous fold line wherein a longitudinal, preferably arcuate cut line 48 joins the discontinuous segments thereof.

Each of the top and bottom walls 30 and 34 has a medial transverse fold line 50 and 52, respectively. Similarly, each of the side walls 40 and 42 has a medial longitudinal fold line 54 and 56, respectively.

A channel-forming panel 60 is contiguous with side wall 42 along a longitudinal fold line 62. The channel-forming panel is disposed outwardly proximate the front wall 20 to define a film strip receiving channel 64 therebetween, as best viewed in FIGS. 3 and 5.

A plurality of glue flaps and glue zones are provided in order to assemble the viewer 10 from the blank 10'. The front wall 20 is formed with a pair of opposing glue flaps 66 and 68 which are contiguous therewith along longitudinal fold lines 70 and 72. Preferably, the fold lines 70 and 72 are discontinuous fold lines with preforated slots 74 and 76 joining the respective discontinuous segments. A glue flap 78 is contiguous with channel-forming panel 60 along a longitudinal fold line 80. Upper and lower glue zones 82 and 84 are provided on the interior surface of rear wall member 24. A glue flap 86 is contiguous with top wall 30 along a transverse fold line 88.

The channel-forming panel 60 is formed with an arcuate notch 90 intermediately along the top edge thereof. The notch 90 aids in the insertion and movement of the film strip 12 within the channel 64.

The front wall 20 is formed with a centrally located, generally rectangular light-admitting opening 92 which defines the field view of the slide 14 in the holder 12. The rear wall assembly includes a viewing aperture 94 having an optical axis coincident with the opening 92. The aperture 94 is comprised of a pair of registering apertures 96, 98 formed in the rear wall member 24 and rear wall reinforcing member 26, respectively. When the reinforcing member 26 is folded about score line 28 into adhesive contact with rear wall member 24, a transverse pocket 100 is formed between the boundaries defined by the upper and lower glue zones 82 and 84. A lens 102 is disposed within veiwing aperture 94 and is restrained within the pocket 100 by virtue of an outwardly projecting annular flange 104. Access to the transverse pocket 100 is achieved via the arcuate cut line 48. To reinforce this area, a corresponding arcuate tab 106 is formed along the edge of the reinforcing member 26.

A rectangular opening 108 is formed in the channel-forming panel 60 for registration with the opening 92 in front wall 20. A light diffusing material 110, such as acetate, is adhered over the opening 108 for uniform illumination for the slide 14 during viewing.

Assembly of the viewer 10 from the blank 10' of FIG. 7 is very simply achieved. Adhesive is applied to the glue flaps and glue zones. The reinforcing member 26 is then rotated 180° into contact with rear wall member 24. Subsequently, the top and bottom walls are placed into position by adhering glue flap 86 to the assembled rear wall assembly 22. The side wall 42 is then rotated into engagement with the glue flap 68, and the channel-forming panel 60 is brought proximate the front wall 20 with the glue flaps 66 and 78 in engagement. Finally, the side wall 40 is then rotated into adhesive engagement with the outer surface of glue flap 68 whereupon the assembly is complete.

Once in the assembled condition, the medial fold lines in each of the top, bottom, and side walls will cause the viewer to assume the configuration shown in FIGS. 1-6. The viewer, which is preferably manufactured from heavy paper or cardboard stock, is somewhat resilient. Accordingly, compressive pressure applied to any two opposing walls will cause a relative dimensional displacement between the front wall 20 and rear wall assembly, 22, whereby the viewer may be focused.

The viewer of the present invention is, consequently, of simplified construction when compared with prior art devices. Nonetheless, it possesses sufficient structural integrity to allow for extended use notwithstanding the fact that the same may be fabricated from cardboard or the like should it be designed for disposable use. Obviously, for more permanent applications, the viewer might be manufactured from a lightweight plastic.

While the invention has now been described with reference to certain preferred embodiments, the skilled artisan will recognize that various substitutions, changes, modifications, and omissions may be made without departing from the spirit thereof. Accordingly, it is intended that the scope of the invention be limited solely by that of the following claims.

What I claim is:

1. A collapsible optical viewer for viewing photographic slides, comprising:
   (a) a front wall having a light-admitting opening therein;
   (b) a reinforced rear wall assembly having a viewing aperture therein, said aperture having an optical axis coincident with said opening;
   (c) a magnification lens disposed in said aperture;
   (d) a top wall contiguous with said front wall along a transverse fold line and adhered to said rear wall assembly;
   (e) a bottom wall contiguous with both of said front wall and said rear wall assembly along a pair of spaced transverse fold lines;
   (f) a pair of opposing side walls contiguous with said rear wall assembly along a pair of spaced longitudinal fold lines;
   (g) a pair of glue flaps contiguous with said front wall along a pair of spaced longitudinal fold lines, said glue flaps being adhered to portions of said side walls; and,
   (h) a film strip receiving channel outwardly proximate said front wall, said channel comprising;
      (i) a channel wall comprised of an extension of a first of side walls, contiguous therewith along a longitudinal fold line;
      (ii) a light-admitting opening in said channel wall coincident with said optical axis; and,
      (iii) a light-diffusing element disposed in the opening in said channel wall.

2. The viewer of claim 1, wherein said reinforced rear wall assembly includes a transverse product in registration with said viewing aperture, said magnification lens being disposed within said pocket.

3. The viewer of claim 2, wherein said rear wall assembly comprises a rear wall member and a rear wall reinforcing member contiguous therewith along a transverse score line and adhesively secured thereto on the interior face thereof, the area of adhesive defining the transverse boundaries of said pocket.

4. The viewer of claim 3, wherein said first side wall is contiguous with said rear wall member along a discontinuous longitudinal fold line, a longitudinal cut line joining the discontinuous segments of said fold line and defining means for access to said pocket.

5. The viewer of claim 3, wherein said magnification lens includes a peripheral annular flange projecting outwardly from said viewing aperture into said pocket.

6. The viewer of claim 3, wherein
   (a) each of said top and bottom walls has an outwardly directed transverse, medial fold line; and,
   (b) each of said side walls has an outwardly directed longitudinal fold line; whereby a compression force applied to said viewer will effect a relative dimensional displacement between said front wall and said rear wall assembly.

7. The viewer of claim 4, wherein said cut line is an outwardly directed arcuate cut line and said rear wall reinforcing member includes an outwardly directed arcuate tab for cooperative engagement therewith.

8. The viewer of claim 6, wherein a glue flap is contiguous with said top wall along a transverse fold line which lies in registration with said transverse score line interiorly of said viewer.

9. In a photographic slide viewer having front, rear, side, top, and bottom walls joined in a collapsible configuration, and a film strip receiving channel outwardly proximate said front wall comprised of a channel forming wall spaced from said front wall, wherein said rear wall consists essentially of a rear wall member and a rear wall reinforcing element, the improvement comprising forming said channel wall as a continuous extension of one of said side walls.

10. A blank for forming a collapsible optical viewer comprising:
    (a) a top wall forming panel having a glue flap contiguous therewith along a transverse fold line;
    (b) a front wall forming panel contiguous with said top wall forming panel along a transverse fold line, and having a light-admitting opening formed therein;
    (c) a pair of glue flaps contiguous with said front wall forming panel along longitudinal fold lines;
    (d) a bottom wall forming panel contiguous with said front wall forming panel along a transverse fold line;
    (e) a rear wall assembly forming panel contiguous with said bottom wall forming panel along a transverse fold line;
    (f) first and second side wall forming panels contiguous with said rear wall assembly forming panel along spaced longitudinal fold lines;
    (g) a channel forming panel contiguous with said first side wall forming panel along a longitudinal fold line, having a light-admitting opening formed therein; and,
    (h) a glue flap contiguous with said channel forming panel along a longitudinal fold line.

11. The blank of claim 10, wherein said rear wall assembly forming panel comprises:
    (a) a rear wall member forming panel contiguous with said bottom wall; and,
    (b) a rear wall reinforcing member forming panel contiguous with said rear wall member forming panel along a transverse score line;
    each of said rear wall assembly forming panels having an aperture formed therein.

12. The blank of claim 11, wherein said first side wall forming panel is contiguous with said rear wall member forming panel along a discontinuous longitudinal fold line.

13. The blank of claim 12, wherein an outwardly directed arcuate cut line joins the discontinuous segments of said discontinuous longitudinal fold line.

14. The blank of claim 13, wherein said rear wall reinforcing member forming panel has an outwardly directed arcuate tab for mating with said arcuate cut line.

* * * * *